(12) United States Patent
McCracken, Sr. et al.

(10) Patent No.: US 6,744,873 B1
(45) Date of Patent: Jun. 1, 2004

(54) TELEPHONE ACCESSORY DEVICE

(75) Inventors: Thomas J. McCracken, Sr., Hinsdale, IL (US); William E. McCracken, Sr., Elmhurst, IL (US)

(73) Assignee: William E. McCracken, Elmhurst, IL (US)

( * ) Notice: Subject to any disclaimer, the term of this patent is extended or adjusted under 35 U.S.C. 154(b) by 0 days.

(21) Appl. No.: 09/500,934

(22) Filed: Jan. 15, 2000

(51) Int. Cl.[7] .............................................. H04M 1/00
(52) U.S. Cl. ......................... 379/207.6; 379/207.01; 379/207.7; 379/377
(58) Field of Search ..................... 379/207.06, 207.07, 379/207.1, 40, 47, 41, 32.01, 377

(56) References Cited

U.S. PATENT DOCUMENTS

| | | | | |
|---|---|---|---|---|
| 3,662,111 A | * | 5/1972 | Rubinstein ..................... 179/5 |
| 4,492,820 A | * | 1/1985 | Kennard et al. ................ 179/5 |
| 4,565,902 A | * | 1/1986 | Phillipps ........................ 179/5 |
| 4,613,730 A | * | 9/1986 | Fechalos et al. .............. 179/90 |
| 4,686,697 A | * | 8/1987 | Shapiro et al. ................ 379/38 |
| 4,998,271 A | * | 3/1991 | Tortola et al. ................ 379/32 |
| 5,493,604 A | * | 2/1996 | Hirayama ..................... 379/58 |
| 5,592,529 A | * | 1/1997 | Linsker ........................ 379/32 |
| 5,606,593 A | * | 2/1997 | Smith ........................... 379/33 |
| 5,612,997 A | * | 3/1997 | Vallelonga, Sr. et al. ... 379/393 |
| 5,633,917 A | * | 5/1997 | Rogers ......................... 379/67 |
| 5,699,414 A | * | 12/1997 | Telibasa ....................... 379/98 |
| 5,764,752 A | * | 6/1998 | Waite et al. ................ 379/377 |
| 5,923,748 A | * | 7/1999 | Hwang ........................ 379/377 |
| 6,167,130 A | * | 12/2000 | Rosen ......................... 379/216 |
| 6,201,856 B1 | * | 3/2001 | Orwick et al. ................ 379/40 |

* cited by examiner

Primary Examiner—William J. Deane, Jr.
(74) Attorney, Agent, or Firm—McCracken & Frank LLP

(57) ABSTRACT

A telephone accessory device includes a first circuit that detects an off-hook condition of a telephone and a second circuit responsive to the first circuit wherein the second circuit simulates an on-hook condition when the off-hook condition is detected.

6 Claims, 3 Drawing Sheets

TELEPHONE ACCESSORY DEVICE

TECHNICAL FIELD

The present invention relates generally to telephone equipment, and more particularly to an accessory device for a telephone.

BACKGROUND ART

At the conclusion of a telephone call, the user of the telephone may inadvertently leave the telephone in an off-hook condition. When this occurs, the telephone line connected to the telephone is unavailable for receipt or placement of further calls until the telephone is replaced on the hook. Specifically, during the off-hook condition, a party attempting to call the number of the telephone line is unable to connect to the telephone line and, instead, receives a busy signal. The user at the location of the off-hook telephone is also unable to make outgoing calls, whether over the off-hook telephone or another extension connected to the same telephone line. In addition, upon expiration of a time period following termination of the preceding call, an off-hook signal is generated and sent over the telephone line. This off-hook signal results in the generation of a series of loud beeps by the speaker of the off-hook telephone (these beeps are also heard if another extension on the same line is picked up). The beeps alert the user to replace the telephone handset on the hook.

Occasionally, it may occur that the off-hook beeps are not heard, and hence, a telephone may be left in the off-hook condition for a long period of time. This may occur, for example, when the telephone is located at a distance from the user such that the user is unable to hear the off-hook beeps, or where the user is hard-of-hearing, etc. . . . In addition to being a nuisance for a party attempting to reach the user, this occurrence can be dangerous in situations where communication is essential, for example, where it is necessary to monitor the well-being of the party located at the location of the telephone.

SUMMARY OF INVENTION

According to one aspect of the present invention, a telephone accessory device includes a first circuit that detects an off-hook condition of a telephone and a second circuit responsive to the first circuit wherein the second circuit simulates an on-hook condition when the off-hook condition is detected.

Preferably, the second circuit may comprise a switching circuit and the first circuit may comprise an off-hook tone detector. Also, a timer may be coupled between the first and second circuits and a reset circuit may be coupled to the timer. Still further, a driver circuit may be coupled between the timer and the second circuit.

Still further in accordance with the preferred embodiment, an indicator may be coupled to the driver circuit wherein the indicator may comprise at least one of a visual indicating device and an audible indicating device. In addition, a dialer and a message playback device may be coupled to the first circuit.

According to another aspect of the present invention, a telephone accessory device for connection to a telephone line and a telephone includes an off-hook detector coupled to the telephone line and operable to detect an inactive off-hook condition of the telephone and a switching circuit coupled between the telephone line and the telephone and responsive to the off-hook detector. The switching circuit is operable to disconnect the telephone from the telephone line when the off-hook condition is detected.

According to a still further aspect of the present invention, a telephone accessory device includes an off-hook tone detector that detects an inactive off-hook condition of a telephone and a switching circuit responsive to the off-hook tone detector that simulates an on-hook condition when the inactive off-hook condition is detected. An indicator is operative to provide an indication when the on-hook condition is simulated and a reset circuit is coupled to the switching circuit and is selectively operable to terminate simulation of the on-hook condition.

Other aspects and advantages of the present invention will become apparent upon consideration of the following drawings and detailed description.

DESCRIPTION OF THE PREFERRED EMBODIMENT

Figure 1:
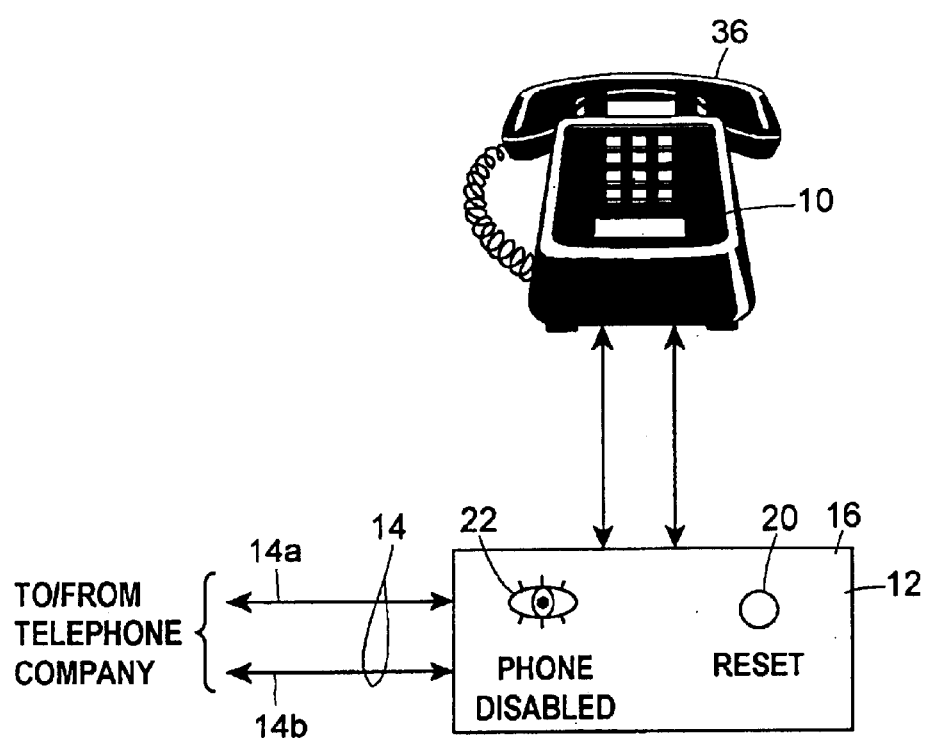
FIG. 1 comprises an elevational view of a telephone together with the telephone accessory device of the present invention.

Referring now to FIG. 1, a telephone 10 is coupled by a telephone accessory device 12 to a telephone line 14 including first and second conductors 14a and 14b. The telephone accessory device 12 is shown in FIG. 1 as being contained in a housing 16 separate from the telephone 10, although it should be understood that the device 12 may be incorporated into the telephone 10, if desired. The device 12 includes a reset button 20 and an optional visual indicator in the form of a light emitting diode (LED) 22 which are described in greater detail hereinafter.

Figure 2:
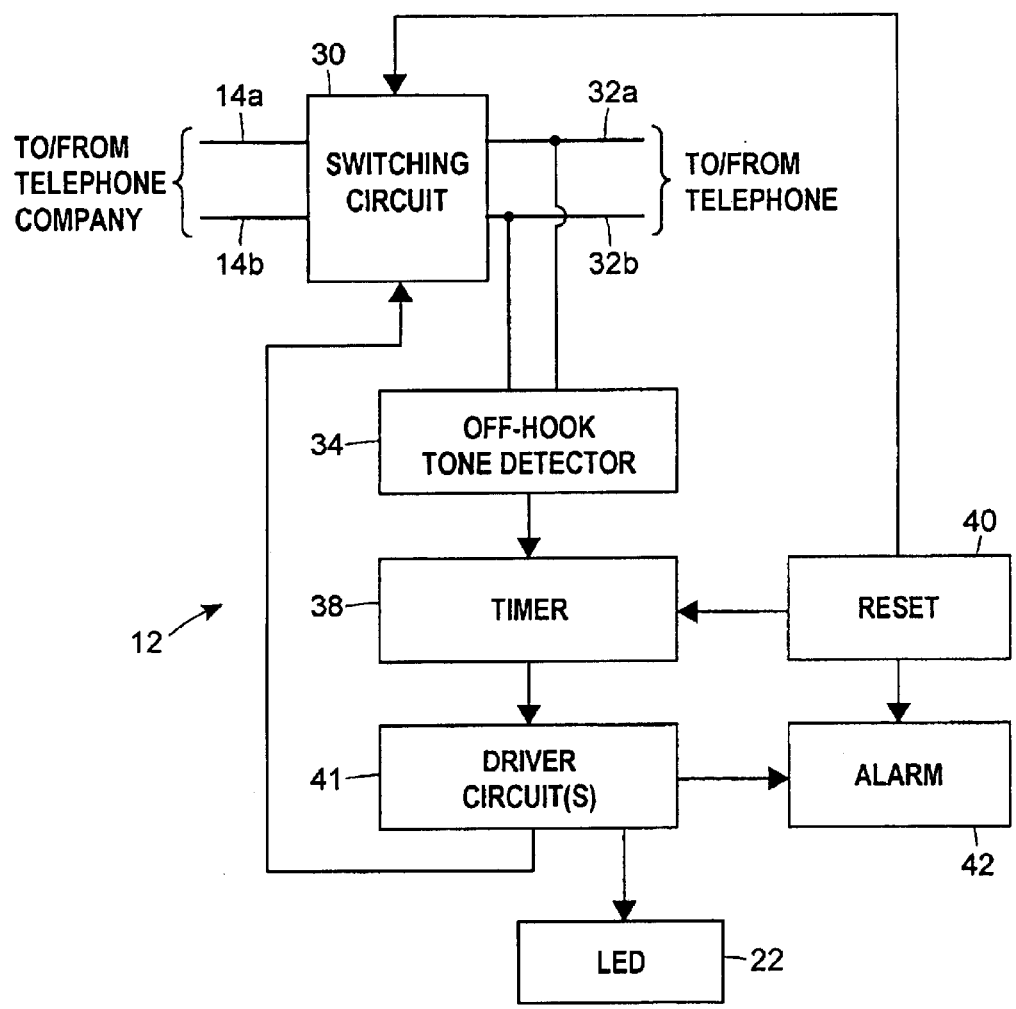
FIG. 2 comprises a block diagram of a first embodiment of the telephone accessory device of FIG. 1.

FIG. 2 illustrates the device 12 in greater detail. A switching circuit 30 is coupled between the first and second conductors 14a, 14b and third and fourth conductors 32a, 32b. The third and fourth conductors 32a, 32b are, in turn, connected to the telephone 10. The device 12 further includes an off-hook tone detector 34 which is coupled to the third and fourth conductors 32a, 32b. If desired, the detector 30 may alternatively be coupled to the first and second conductors 14a, 14b.

The switching circuit may comprise a simple two-pole, two-throw relay switch wherein the poles of the relay switch are connected to the conductors 14a, 14b and wherein a first set of switching contacts are connected to the conductors 32a, 32b. A second set of switching contacts are provided to a source of voltage which simulates an on-hook condition, as noted in greater detail hereinafter.

The detector 34 is operable to sense the alert signals that are sent to the telephone 10 by the telephone company after a period of inactivity on the telephone line 14 and which cause the telephone to emit the familiar and distinctive fast beeps that prompt a user to hang up the telephone 10. The detector 34 may be of any suitable design, such as an analog or digital frequency detector which is tuned to detect signals in a particular frequency band or a digital signal processor, or the like. In addition, the detector 34 may optionally include a microphone or other acoustic or inductive device which senses either the signals in the conductors 32 or 14 or the sounds produced by a speaker in a handset 36 (FIG. 1) of the telephone 10, in which case the detector 34 would not be directly connected to the conductors 32 or 14. Still further, as noted in greater detail hereinafter, the detector 34 may be replaced by any suitable circuit that senses inactivity on the conductors 32 or 14.

The detector 34 may be coupled to an optional timer circuit 38. A reset circuit 40 is coupled to the switching circuit 30 and the timer circuit 38 (if the latter is used). The reset circuit 40 provides a reset signal of appropriate level to the circuits 30 and 38 for the purposes hereinafter described when the reset button 20 of FIG. 1 is depressed.

One or more optional driver circuits 41 may be coupled between the timer 38 (or the detector 34 if the timer 38 is not used) and one or more optional indicator devices, such as the LED 22 and an audible alarm circuit 42. The driver circuit(s) 41 may also provide a control signal to the switching circuit 30. The control signal may instead be directly provided to the switching circuit 30 by the detector 34 or the timer 38.

During normal operation of the telephone 10, the switching circuit 30 is latched in a normal state whereby the first conductor 14a is connected to the third conductor 32a and the second conductor 14b is connected to the fourth conductor 32b. Accordingly, during such normal operation, a user may receive and place calls in a conventional fashion. However, if the handset 36 is not placed back on-hook within a particular time period following a telephone call, the alert signals will be sent by the telephone company over the conductors 14 and 32 to the telephone 10. In this case, the detector 34 senses the presence of the alert signals on the conductors 32 (or 14) and develops a detection signal which is provided to the timer circuit 38. The timer circuit 38 develops a timer signal which switches between low and high levels at a predetermined time following initial detection of the alert signals. The transition between low and high levels in the timer signal causes the driver circuit(s) 41 to develop a control signal that instructs the switching circuit to latch into a state that results in disconnection of the conductors 14a and 14b from the conductors 32a and 32b. In addition, during this time, the switching circuit 30 provides a voltage across the conductors 14a and 14b that simulates an on-hook condition of the telephone 10. In effect, this action of the switching circuit 30 isolates the telephone 10 from the telephone network and permits receipt or sending of calls over the telephone line 14 using other equipment, such as another telephone also connected to the line 14.

During the time that the telephone 10 is isolated from the line 14, the driver circuit(s) 41 may cause one or more indications to be developed by the LED 22 and/or the alarm circuit 42 alerting the user to the off-hook condition. Once the user responds to the indication(s) and replaces the handset 36 on-hook, the user may depress the reset button 20 and cause the reset signal to be supplied to the switching circuit 30 and to the timer 38. The reset signal resets the timer circuit 38 and causes the switching circuit 30 to revert to and latch in the normal state. The telephone 10 may thereafter be used in the conventional fashion to place and receive calls.

From the foregoing, it should be evident that the timer circuit 38 provides a delay period between initial detection of the alert signals and isolation of the telephone by the switching circuit 30. Accordingly, the timer circuit 38 provides a degree of immunity from noise or other spurious signals.

Figure 3:
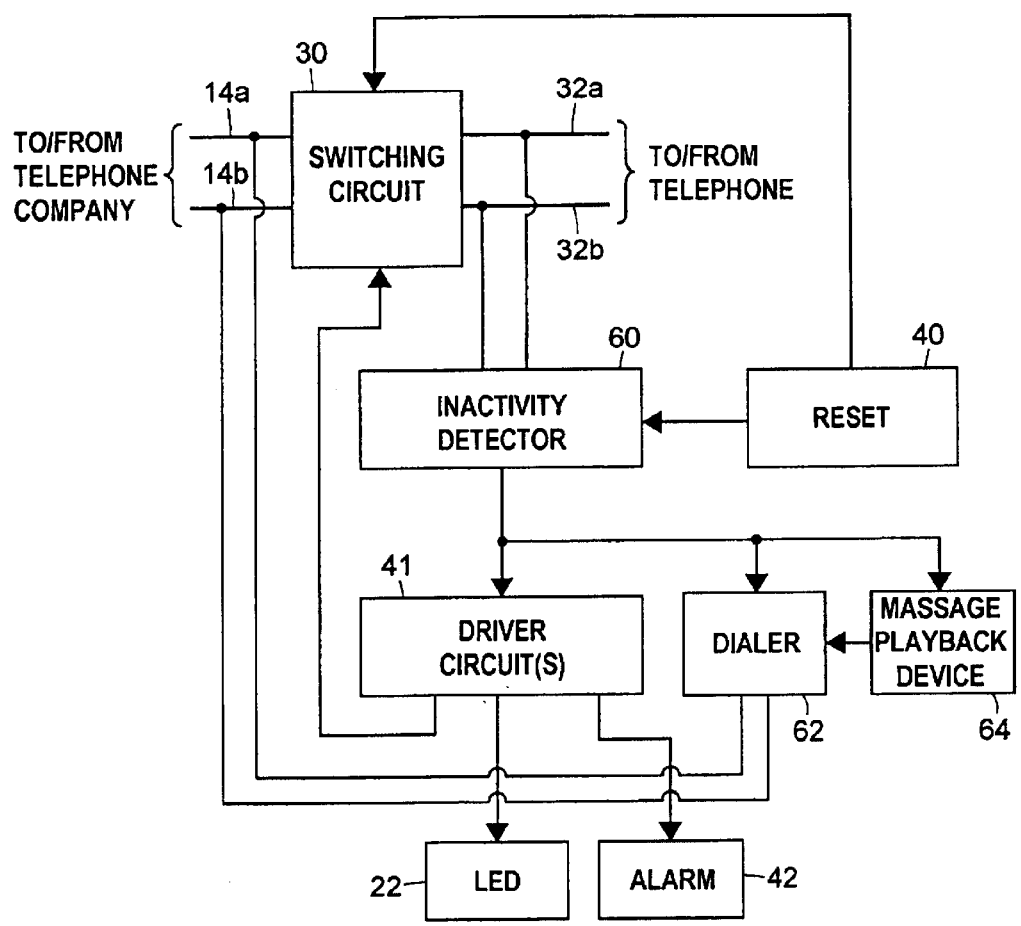
FIG. 3 comprises a block diagram of a further embodiment of the telephone accessory device of FIG. 1.

FIG. 3 illustrates modifications to the embodiment of FIG. 2. Elements common to FIGS. 2 and 3 are assigned like reference numerals and will not be described further. The off-hook tone detector 34 and the timer circuit 38 are replaced by an inactivity detector 60 which develops an inactivity signal when the telephone 10 is off-hook and the level of the signals on the conductors 32 (or 14) remains below a certain threshold for a particular period of time. The inactivity detector 60 is of any suitable design and provides the inactivity signal not only to the driver circuit(s) 41 but also to an optional dialer circuit 62 and an optional message playback device 64. The message playback device 64 may be coupled to the dialer circuit 62 or may be connected directly to the telephone line 14.

When the inactivity signal is developed, the driver circuit(s) 41 cause the switching circuit 30 to isolate the telephone 10 from the telephone network, as in the embodiment of FIG. 2. In addition, the dialer 62 and the message playback device 64 are instructed to dial a stored telephone number and play back a stored message alerting a remote party that the telephone 10 is off-hook. This feature is particularly useful in a situation where the telephone 10 is the only communication device connected to the telephone line 14 and/or where it is possible that an off-hook alarm will not be noticed by the user.

The reset circuit 40, when actuated, provides a reset signal to the inactivity detector 60 to cause the latter to reset to an initial condition awaiting detection of inactivity on the conductor 32 or 14 when the telephone 10 is off-hook.

It should be noted that the dialer 62 and the message playback device 64 may be utilized in the embodiment of FIG. 2, in which case such elements are controlled by the detector 34 or the timer 38 (if used).

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights of all modifications which come within the scope of the appended claims are reserved.

We claim:

1. A telephone accessory device, comprising:
   a first circuit that detects an off-hook condition of a telephone connected to a telephone line; and
   a second circuit responsive to the first circuit wherein the second circuit isolates the telephone from the telephone line when the off-hook condition is detected, thereby allowing for use of one or more additional telephones connected to the telephone line.

2. The telephone accessory device of claim 1, wherein the second circuit comprises a switching circuit.

3. The telephone accessory device of claim 1, further including a dialer and a message playback device coupled to the first circuit.

4. A telephone accessory device for connection to a telephone line and a telephone, comprising:
   an off-hook detector coupled to the telephone line and operable to detect an inactive off-hook condition of the telephone; and
   a switching circuit coupled between the telephone line and the telephone and responsive to the off-hook detector and operable to isolate the telephone from the telephone line when the off-hook condition is detected, thereby allowing for use of one or more additional telephones connected to the telephone line.

5. The telephone accessory device of claim 4, further including a dialer and a message playback device coupled to the off-hook detector.

6. A telephone accessory device, comprising:
   an off-hook tone detector that detects an inactive off-hook condition of a telephone connected to a telephone line;
   a switching circuit responsive to the off-hook tone detector and that isolates the telephone from the telephone line when the inactive off-hook condition is detected, thereby allowing for use of one or more additional telephones connected to the telephone line;

an indicator operative to provide an indication when the on-hook condition is simulated; and a reset circuit coupled to the switching circuit and selectively operable to terminate simulation of the on-hook condition.

\* \* \* \* \*